(12) United States Patent
Kardach et al.

(10) Patent No.: US 7,454,632 B2
(45) Date of Patent: Nov. 18, 2008

(54) REDUCING COMPUTING SYSTEM POWER THROUGH IDLE SYNCHRONIZATION

(75) Inventors: James P Kardach, Saratoga, CA (US); David L Williams, San Jose, CA (US); Animesh Mishra, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 464 days.

(21) Appl. No.: 11/153,950

(22) Filed: Jun. 16, 2005

(65) Prior Publication Data

US 2006/0288240 A1   Dec. 21, 2006

(51) Int. Cl.
G06F 1/00 (2006.01)
G06F 1/32 (2006.01)

(52) U.S. Cl. .................. 713/300; 713/320; 713/323

(58) Field of Classification Search .............. 713/300, 713/323, 324, 330
See application file for complete search history.

(56) References Cited

U.S. PATENT DOCUMENTS

| | | | |
|---|---|---|---|
| 5,752,050 A | * | 5/1998 | Hernandez et al. .......... 713/330 |
| 5,754,869 A | | 5/1998 | Holzahmmer et al. |
| 6,092,209 A | * | 7/2000 | Holzhammer et al. ....... 713/324 |
| 2003/0163745 A1 | | 8/2003 | Kardach |
| 2003/0196127 A1 | | 10/2003 | Olsen |
| 2006/0288240 A1 | | 12/2006 | Kardach et al. |

OTHER PUBLICATIONS

PCT Search Report and written opinion for PCT/US2006/023691, filed Jun. 16, 2006, mailed Jan. 9, 2007 (12 pages).
PCT International Preliminary Report on Patentability and written opinion for PCT2006/023691, filed Jun. 16, 2006, mailed Jan. 3, 2008 (8 pages).

* cited by examiner

Primary Examiner—Suresh K Suryawanshi
(74) Attorney, Agent, or Firm—Blakely, Sokoloff, Taylor & Zafman LLP (57) ABSTRACT

Systems and methods of power management provide for controlling the idleness of a processor based on an operating system schedule. The idleness of at least one device is synchronized with the idleness of the processor. Idleness synchronization may involve deferring bus transactions, suspending memory refresh, turning off power to clock sources and turning off power to combinatorial logic during an idle window in the OS schedule.

24 Claims, 6 Drawing Sheets

76
Control an idleness of a processor based on an operating system (OS) schedule

78
Synchronize an idleness of at least one device with the idleness of the processor

FIG. 8

REDUCING COMPUTING SYSTEM POWER THROUGH IDLE SYNCHRONIZATION

BACKGROUND

1. Technical Field

Certain embodiments of the present invention generally relate to power management. In particular, some embodiments relate to synchronizing the idleness of system devices with the idleness of a system processor based on an operating system schedule.

2. Discussion

The popularity of computing systems continues to grow and the demand for more functionality has reached new heights. As a result, modern workloads and computing systems can consume more power and generate more heat than previously experienced. Modern platform power management techniques use drivers to emulate hardware timers, where when a timer expires the respective device has been idle for a predetermined amount of time and is turned off to conserve power. While such an approach can be acceptable at coarse levels of granularity, there may be lost power saving opportunities at relatively fine levels of granularity.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

In the following description, for purposes of explanation, numerous specific details are set forth in order to provide a thorough understanding of the embodiments of the present invention. It will be evident, however, to one skilled in the art that the embodiments of the present invention may be practiced without these specific details. In other instances, specific apparatus structures and methods have not been described so as not to obscure the embodiments of the present invention. The following description and drawings are illustrative of the embodiments of the invention and are not to be construed as limiting the embodiments of the invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. Furthermore, the use of the terms "first", "second", etc. do not necessarily infer a chronological relationship, and are used to facilitate discussion only. In addition, the term "coupled" may be used to refer to any arrangement, whether direct or indirect, in which the components in question have a mechanical, electrical, optical, electromagnetic or other relationship.

Figure 1:
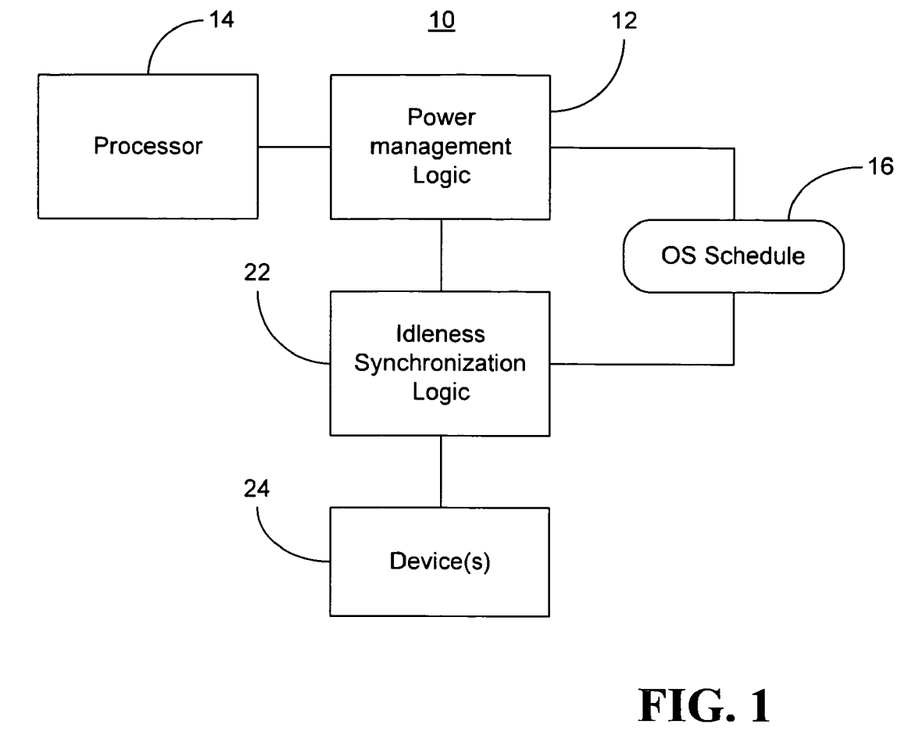
FIG. 1 is a block diagram of an example of a power management apparatus according to one embodiment of the invention.

FIG. 1 shows an apparatus 10 in which power management logic 12 controls the idleness of a processor 14 based on an operating system (OS) schedule 16. The processor 14, which could have a single core or multi-core architecture, may include a reduced instruction set computer (RISC), a pipelined processor, a complex instruction set computer (CISC), and so on. Thus, the illustrated processor 14 is able to execute program code/instructions such as OS software and can also include instruction fetch units, instruction decoders, execution units, and so on (not shown). Furthermore, the apparatus 10 may be implemented using hardware techniques such as complementary metal oxide semiconductor (CMOS) technology, controller firmware, microcode, software techniques, and any combination thereof.

The illustrated apparatus 10 also includes synchronization logic 22 to synchronize the idleness of the processor 14 with the idleness of one or more devices 24. The devices 24 may be system buses, memory devices, clock sources, controllers, etc. By creating such a platform-wide idleness scheme, the apparatus 10 can be more aggressive in power saving. In addition, conducting the synchronization based on the OS schedule 16, which has a relatively high level of granularity, the apparatus 10 is able to achieve greater stability and much more resolution over power management activities.

OS Schedule

As already noted, the OS schedule 16 can be used to force the processor 14 into and out of an idle state on a relatively fine level of granularity. For example, the OS schedule 16 could be implemented as a periodic interrupt that is generated by a timer and is programmed to a value such as 10-15 ms. If the illustrated processor 14 is in an idle state such as one of the Advanced Configuration and Power Interface (e.g., ACPI Specification, Rev. 3.0, Sep. 2, 2003) C1-C3 states, it is inactive and consumes a relatively low amount of power. When the OS schedule timer counts down, the timer can generate an interrupt to the processor 14, where the interrupt may awaken the processor 14 into an active/executing state. In ACPI, the active state is referred to as the C0 state. Upon awakening, the illustrated processor 14 begins to execute a workload scheduled by the OS. When the workload is complete, the processor 14 can return to one of the idle states until the next OS schedule timer interrupt is detected. Thus, the power management logic 12 is able to detect an event such as an OS schedule timer interrupt, place the processor 14 in an active state in response to the event, and remove the processor 14 from the active state if the processor is ready to enter an idle state. This process can be repeated on a periodic basis according to the OS schedule 16.

Figure 2:
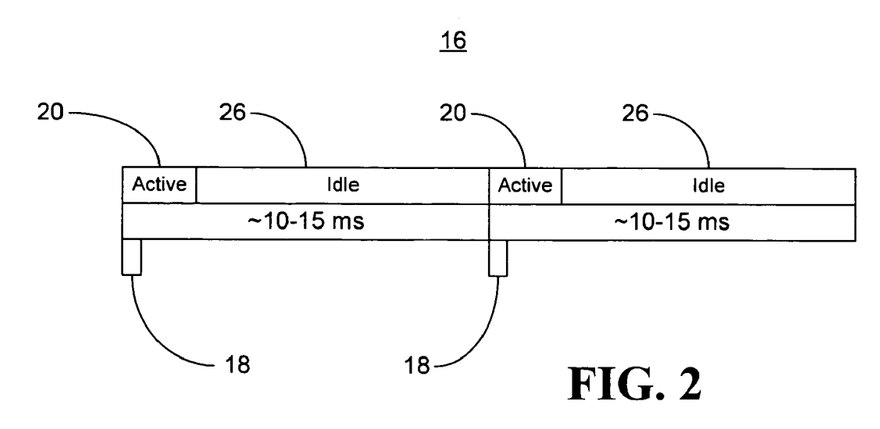
FIG. 2 is a timing diagram of an example of an operating system schedule according to one embodiment of the invention.

FIG. 2 illustrates an OS schedule 16 in which timer interrupts 18 are issued every 10-15 ms to awaken a processor. As a result, the processor is placed in an active state and begins to execute a workload scheduled by the OS during active periods 20. When the scheduled workload is completed, the processor can return to an idle state during idle periods 26 until the next OS schedule timer interrupt is detected. In the illustrated example, the processor spends roughly 95% of the OS schedule 16 in the idle states. It has been determined that such can be the case for many usage models. For example, in one mobile workload benchmark, the processor may spend a substantial portion of time simply waiting for user input. It should be noted that under conventional approaches, the remainder of the platform/system may be unnecessarily active during these idle periods 26. In the illustrated embodiments, the idle periods 26 can be leveraged across the entire platform to achieve greater power savings.

Idleness Synchronization

Figure 3:
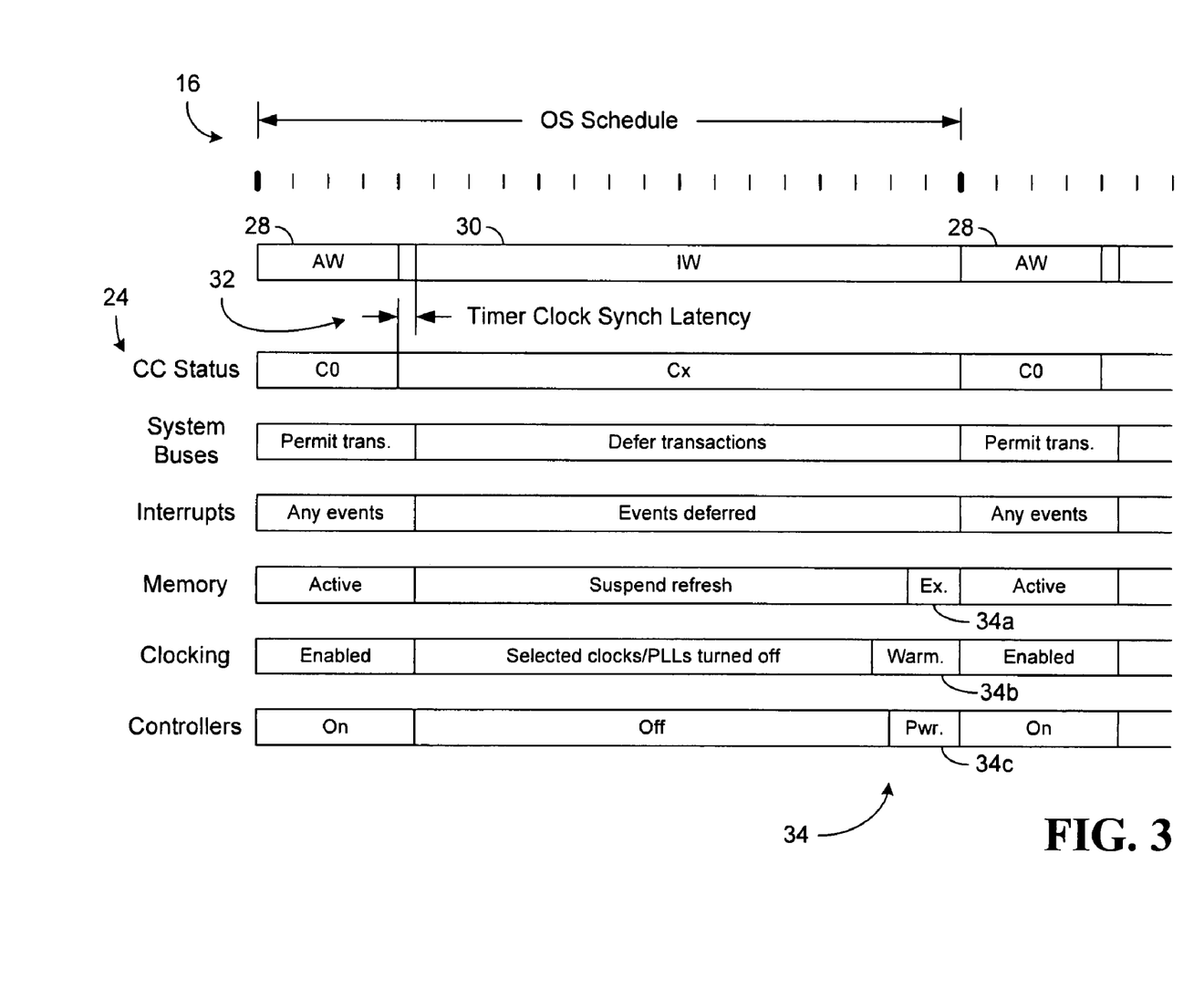
FIG. 3 is a timing diagram of an example of an idleness synchronization scheme according to one embodiment of the invention.

Turning now to FIG. 3, one approach to synchronizing the idleness of a plurality of devices with an OS schedule 16 is shown in greater detail. In the illustrated example, an active window (AW) 28 and an idle window (IW) 30 are defined in the OS schedule 16, where the AW 28 is associated with an active state of the processor and the IW 30 is associated with an idle state of the processor. Because the illustrated OS schedule 16 is fixed during a given interval, and the AW 28 is variable based on the workload of the processor, the IW 30 can be calculated/predicted to a great level of certainty for each timer interrupt. In particular, the IW 30 may be determined based on a timer clock synchronization latency 32 of the processor, where the OS schedule timing functionality uses a timer clock that is separate from the may system clock. In this regard, the processor may need to use the timer clock whenever the processor is ready to enter an idle state because the main system clock may be powered down during the IW 30. Synchronization with the timer clock may therefore be necessary. By permitting each of the devices 24 such as system buses, interrupts, memory devices, clock sources, and controllers, to be active during the AW 28 and preventing this activity during the IW 30, the illustrated embodiment creates a highly ordered power control environment for the devices 24. Such an environment can make the system behavior much more deterministic and can enable more aggressive power saving techniques.

For example, in the illustrated embodiment, the preventing includes deferring bus transactions, deferring interrupts, suspending memory refresh, turning off power to clock sources and turning off power to system/controller combinatorial logic until the next AW. Combinatorial logic elements generally have at least one output channel and one or more input channels, all characterized by discrete states. Thus, at any instant the state of each output channel can be completely determined by the states of the input channels at the same instant. By selectively powering such logic on and off, substantial power savings can be achieved. In the resulting scheme, all devices can work together and sleep together.

It can also be seen that, depending upon the device, an idleness exit procedure may be initiated during an exit period 34 (34a-34c) near the end of the IW 30. For example, the memory controller may run an exit suspend refresh routine during exit period 34a in order to prepare the memory for the next AW 28. Similarly, a phase locked loop (PLL) warm-up routine may be executed during exit period 34b for any PLLs that have been turned off. In the illustrated example, a power up routine is also conducted during exit period 34c for any combinatorial logic that may have been turned off during the IW 30. Because the length of the IW 30 may be linked to the OS 16, and is therefore known, the idleness exit procedures can be conducted without delaying the next AW 28.

Figure 4:
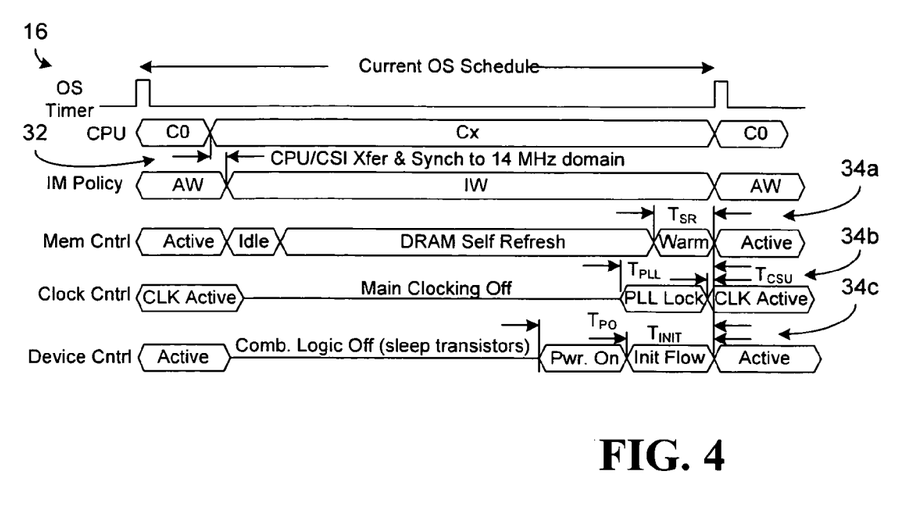
FIG. 4 is a timing diagram of an example of an idleness exit scheme according to one embodiment of the invention.

FIG. 4 shows one example of an exit procedure scheme in greater detail. In particular, a dynamic random access memory (DRAM) device can be associated with a suspend refresh exit period 34a that corresponds to a suspend refresh time "$T_{SR}$". A main clock may be associated with a PLL lock exit period 34b that corresponds to a PLL lock time "$T_{PLL}$". Combinatorial logic can be associated with a power on exit time 34c that corresponds to a power on time "$T_{PO}$" and an initialization time "$T_{INIT}$". Thus, the DRAM, main clock and combinatorial logic can each be prepared for the next active window in the OS schedule 16.

Figure 5:
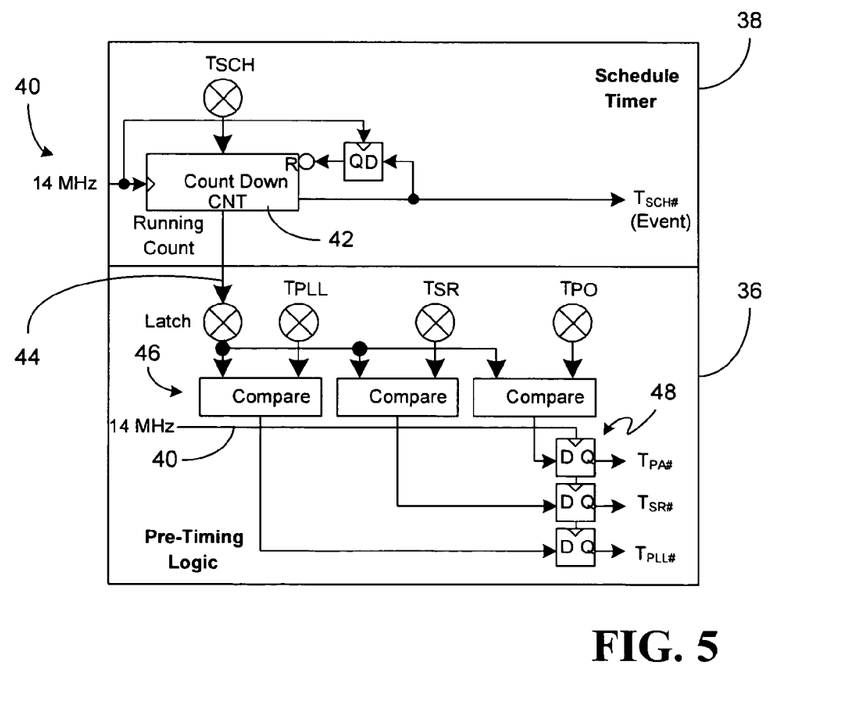
FIG. 5 is a schematic diagram of an example of pre-timing logic according to one embodiment of the invention.

Turning now to FIG. 5, a schedule timer 38 for issuing OS schedule events "$T_{SCH\#}$" and pre-timing logic 36 for initiating idleness exit procedures is shown. In particular, the illustrated schedule timer 38 includes a timer clock input 40 and a counter 42 that counts down from an initial count value "$T_{SCH}$". In a personal computer (PC) system, the schedule timer 38 may be an 8254 timer that generates an IRQ0 interrupt, where the interrupt will awaken the processor from its idle state; however many types of timer logic can be used to perform this function and the embodiments are not limited to an 8254 implementation. For example in some PC systems an RTC, Real Time Clock, is used to generate the OS schedule timings, while the HPET, High Precision Event Timer is used in others cases; the embodiments can be made to work around any OS schedule timing logic. The timer clock input 40 may receive a clock signal that is separate from a main clock signal that is provided to the processor. In one example, the timer clock signal is a 14 MHz signal whereas the main clock signal has a higher frequency such as 1 GHz. When the counter 42 reaches zero, it can generate the OS schedule event $T_{SCH\#}$, reload the initial count value and start the process over again. The OS can change the frequency with which schedule events are issued by changing the initial count value, which may be stored in an appropriate register. As already discussed, the OS schedule events can be used to create/determine the active window. The OS can change the OS schedule interval, but the interval will remain constant until it is changed again. The pre-timing logic can automatically adjust to the OS changing its timer interval by comparing pre-timing logic values to the actual value of a running count value 44 from the OS hardware schedule timer 38.

The illustrated pre-timing logic 36 latches the running count value 44 into a plurality of compare modules 46 that compare the running count value 44 to the appropriate exit period value. As the exit period values are reached, the necessary signaling (e.g., $T_{PA\#}$, $T_{SR\#}$, $T_{PLL\#}$) can be generated by flip-flops 48, which also use the timer clock input 40, to initiate the corresponding idleness exit procedures. The schedule timer 38 and the pre-timing logic 36 may be centrally located or distributed throughout the platform, depending upon the circumstances.

Figure 6:
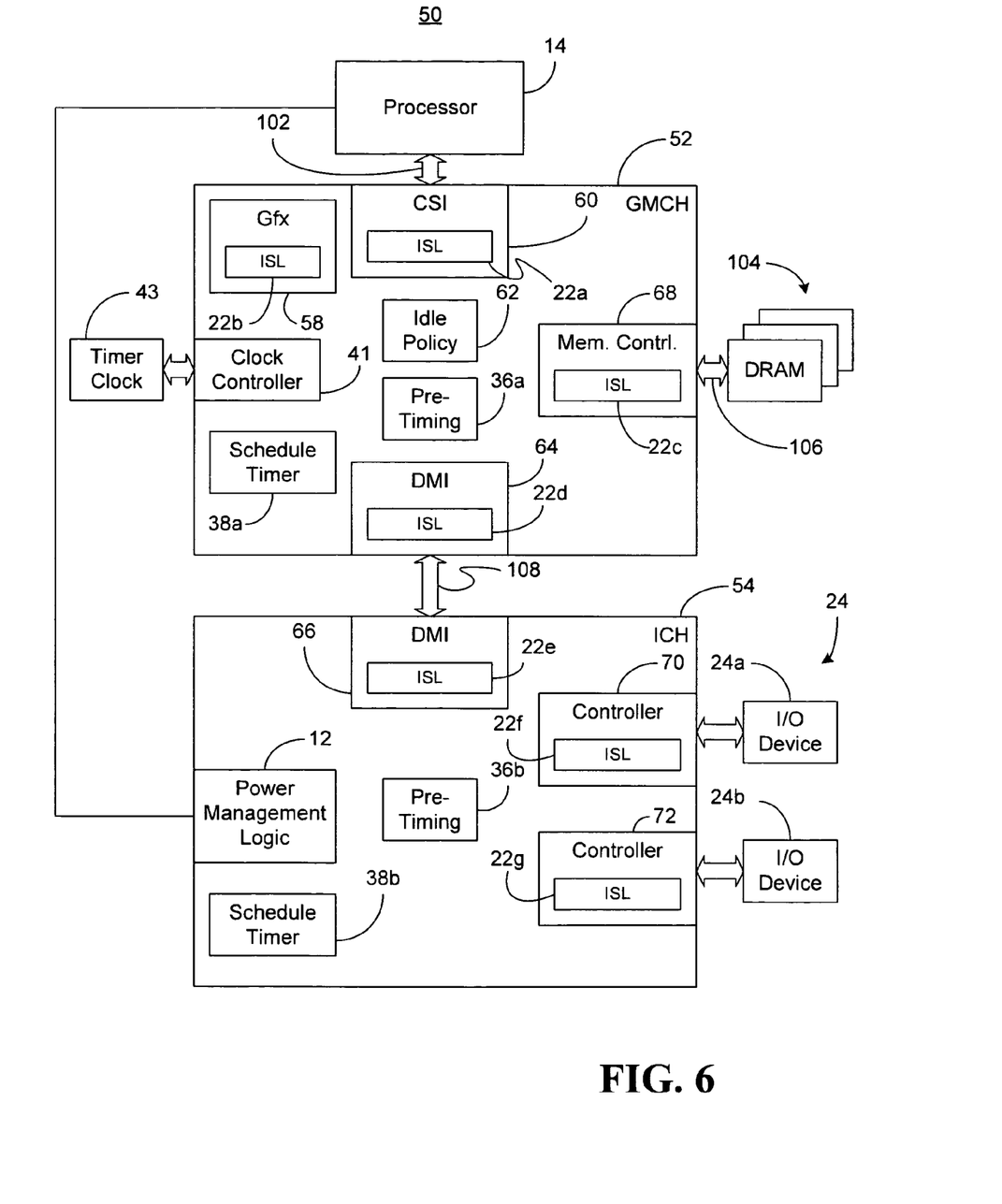
FIG. 6 is a block diagram of an example of a system according to one embodiment of the invention.

FIG. 6 shows a system 50, wherein the system 50 may be part of a server, desktop personal computer (PC), notebook PC, personal digital assistant (PDA), wireless "smart" phone, and so on. The illustrated system 50 has a processor 14, a graphics memory controller hub (GMCH) 52 and an input/output controller hub (ICH) 54. The illustrated processor 14 communicates with the GMCH 52, also known as a Northbridge, via a high speed bus 102 such as a common systems interconnect (CSI) point-to-point fabric that can interconnect many of the components in the system 50. The processor 14 could also communicate with the GMCH 52 via a front side bus (FSB). The GMCH 52 may communicate with system dynamic random access memory (DRAM) 104 via a memory bus 106. The DRAM 104 modules may be incorporated into a single inline memory module (SIMM), dual inline memory module (DIMM), small outline DIMM (SODIMM), and so on. The GMCH 52 may also communicate with the ICH 54, which may be referred to as a Southbridge, over a hub bus 108. In the illustrated embodiment, the hub bus 108 is a DMI (Direct Media Interface) bus. The hub bus 108 could also include peripheral component interconnect (PCI) bus functionality. The ICH 54 may also be coupled to input/output (I/O) devices 56 (56*a*, 56*b*), which may include hard disk drives (HDDs), optical disk drives (ODDs), USB (Universal Serial Bus, e.g., USB Specification 2.0, USB Implementers Forum) buses, flash memory, etc.

In the illustrated example, the GMCH 52 includes a clock controller 41 that receives a timer clock signal from a timer clock 43. The ICH 54 may include power management logic 12, which can use schedule timer 38 (38*a*, 38*b*) circuitry to control the idleness of the processor 14 based on an OS schedule and the timer clock signal. Idleness synchronization logic (ISL) 22 (22*a*-22*g*) can be distributed throughout the system 50, wherein the ISL 22 is able to synchronize the idleness of one or more devices with the idleness of the processor 14 in accordance with an OS schedule-based idle policy 62. In one example, the idle policy 62 can enforce idle window rules, where the ISL 22 manages device participation with respect to these rules. For example, a processor interface module 60 could include ISL 22*a*, where the ISL 22*a* may synchronize the idleness of the high speed bus 102 with the idleness of the processor 14. In particular, the ISL 22*a* could permit transactions on the bus 102 during active windows in the OS schedule and defer transactions on the bus 102 during idle windows in the OS schedule until the next active window. Similarly, hub interface modules 64, 66 can include ISLs 22*d*, 22*e*, respectively, where the ISLs 22*d*, 22*e* can defer transactions on the hub bus 108 during idle windows in the OS schedule. Deferring bus transactions during the idle windows can provide significant power savings.

In addition, a memory controller 68 may include ISL 22*c*, which supports activities in the DRAM 104 such as read/write accesses and self refresh during the active window. The ISL 22*c* can suspend these activities during the idle windows. For example, it has been determined that suspending memory refresh in the DRAM 104 may conserve a substantial amount of power. Also in the illustrated example, I/O controllers 70, 72 include ISLs 22*f*, 22*g*, respectively, for turning off power to power to combinatorial logic (not shown) in the controllers 70, 72 during the idle windows. As already noted, by selectively powering combinatorial logic on and off, substantial power savings can be achieved. Furthermore, a graphics (Gfx) module 58 could include ISL 22*b*, where the ISL 22*b* may synchronize the idleness of the Gfx module 58 with the idleness of the processor 14 to create a more ordered environment. In yet another example, clock logic (not shown) can selectively turn off power to various clock sources to synchronize their idleness with the idleness of the processor 14.

The illustrated system 50 also includes pre-timing logic 36 (36*a*, 36*b*) circuitry to manage the exiting of the various devices from their respective sleep states during the idle windows. By initiating the appropriate idleness exit procedures, the pre-timing logic 36 can substantially obviate idleness-related latency. The result can be a highly deterministic solution that provides for unique power saving opportunities.

One key to enabling this sort of platform behavior could involve changing the way active block I/O devices (e.g., bus masters) operate. Conventional bus masters operate anytime, which may lead to the system-level power management problems currently experienced. In one approach, these devices may only be allowed to operate during active windows. The behavior of many bus controllers and some devices may have to comply with the idle policy 62 in order to create a highly ordered behavior. Such a result could be difficult to obtain as many of these devices were designed to not operate in this fashion. This compliance requirement, however, can be simplified by observing the system behavior as a whole.

It may be observed first that the system 50 is mostly idle, and when executing a moderate workload is also idle (e.g., doing nothing). If the system 50 is idle 90% of the time, and (in general) devices are doing nothing when idle, it may be easier to force block I/O devices to behave in this manner when idle. Roughly 90% of the benefit may be achievable while avoiding 90% of the difficulties associated with block I/O device behavior if idleness synchronization is only used to enhance the behavior of idle systems.

To elaborate further, much of the performance of block I/O devices is derived for when the device is very busy (e.g., executing ISOSYNCH data streams). Much of the optimization for these active workloads could compromise performance in the idle state because it may not be known when this behavior is needed. If we can identify when the system is idle and then change the behavior of these devices to obtain fine grain power control, then it may be easier to change these devices without radically affecting their system behavior. For example, the system 50 could be switched into an active "mode" when it is determined that the system 50 is active (upon an OS schedule interval). Here good idle performance behavior can be obtained while maintaining the legacy active behavior with a minor impact to performance. Such an approach may require that the idle policy 62 dynamically determine when the system is active or idle and then switch the platform into a normal or idle behavior. Simply put, the ISL 22/idle policy 62 may selectively synchronize the idleness of each of the devices with the idleness of the processor 14 based on the overall idleness of the system 50.

Figure 7:
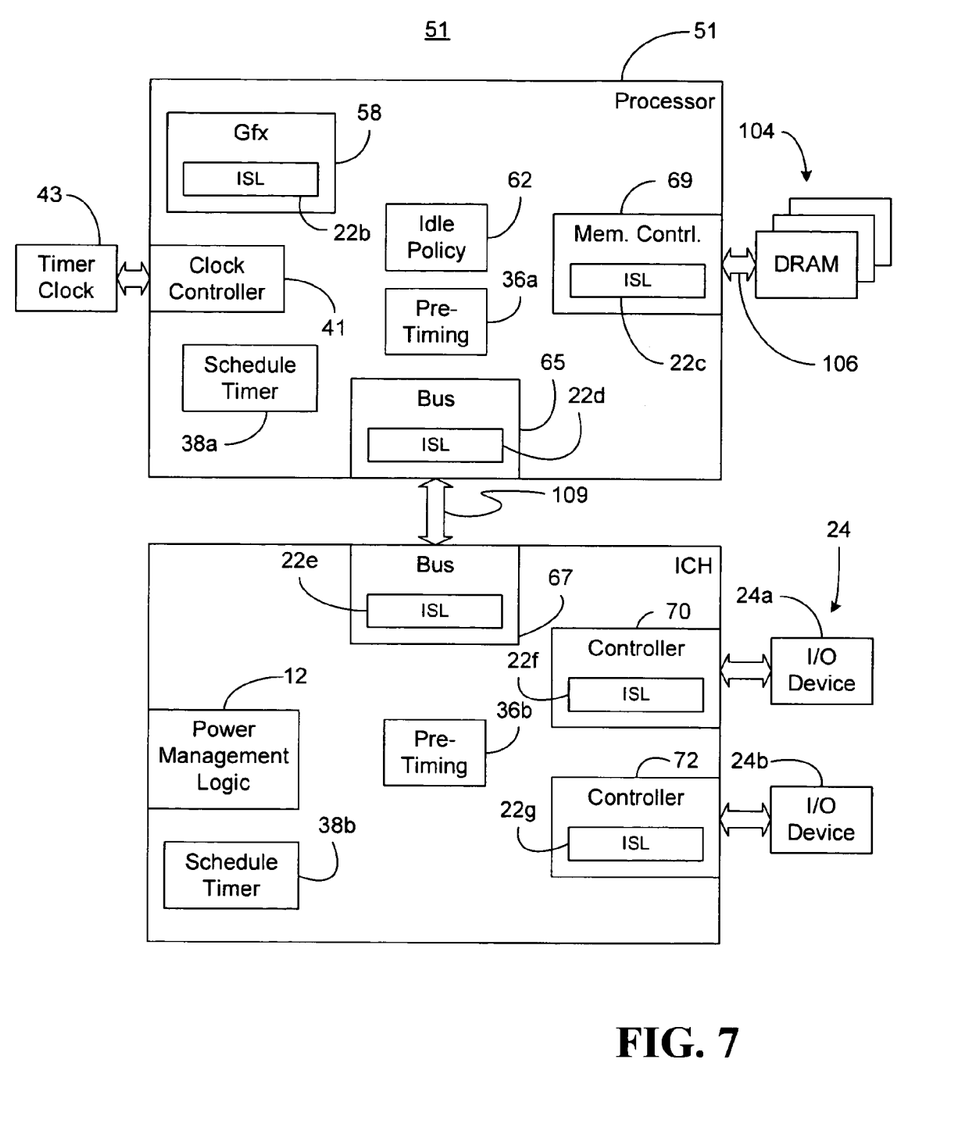
FIG. 7 is a block diagram of an example of a system according to one embodiment of the invention.

FIG. 7 shows an alternative system 51 in which a memory controller 69 is included on the same die as a processor 15. In the illustrated example, bus interface modules 65, 67, include the ISL 22*d*, 22*e*, respectively, for selectively deferring bus transactions on a bus 109 to the next active window in order to synchronize the latency of the bus 109 with the latency of the processor 15.

Figure 8:
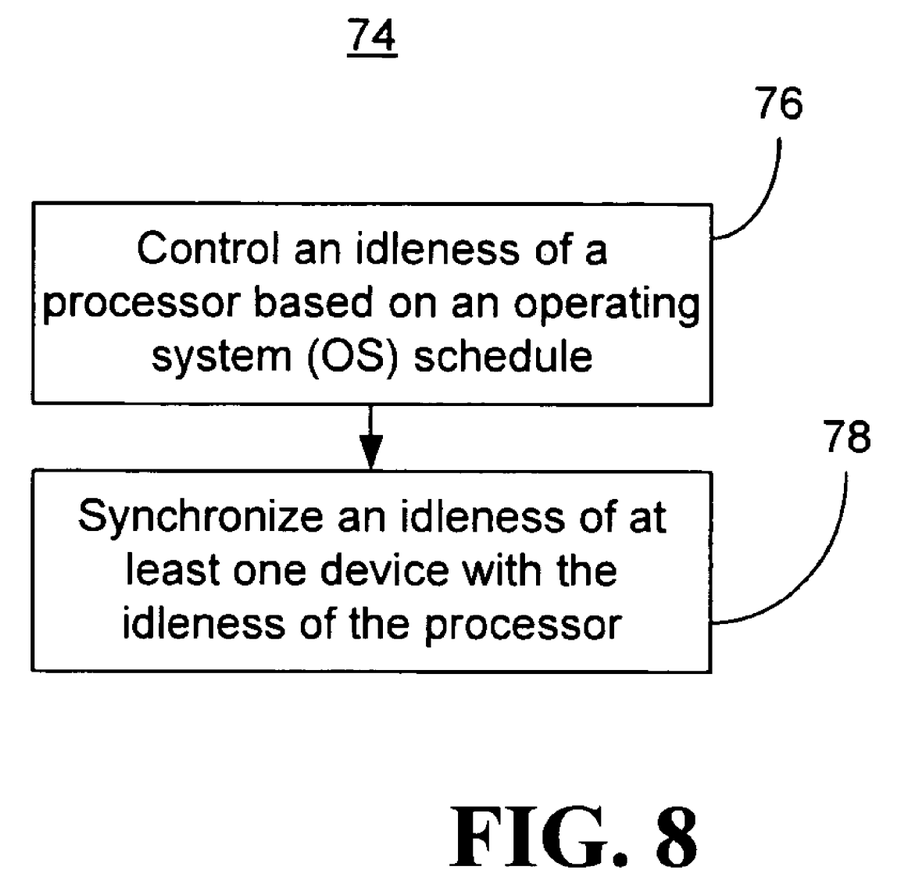
FIG. 8 is a flowchart of an example of a method of power management according to one embodiment of the invention.

Turning now to FIG. 8, a method 74 of power management is shown. The illustrated method 74 may be implemented as logic, for example, using hardware, microcode or any machine-readable medium or article which may store an instruction or a set of instructions that, if executed by a machine (for example, by a multi-processing unit and/or by other suitable machines), cause the machine to perform a method and/or operations in accordance with embodiments of the invention. Such hardware may include, for example, complementary metal oxide semiconductor (CMOS) technology-based or transistor-transistor-logic (TTL) technology-based structures. The machine may include, for example, any suitable processing platform, computing platform, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

In the illustrated example, processing block 76 provides for controlling an idleness of a processor based on an OS schedule. Such a process may involve, for example, detecting an OS schedule event, placing the processor in an active state in response to the event, removing the processor from the active state if the processor is ready to enter an idle state, and repeating the detecting, placing and removing on a periodic basis according to the OS schedule. Block 78 provides for synchronizing the idleness of at least one device with the idleness of the processor. In one example, such a process can include permitting an activity of the device during an active window in the OS schedule and preventing the activity during an idle window in the OS schedule.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An apparatus comprising:
   power management logic to control an idleness of a processor based on an operating system (OS) schedule; and
   synchronization logic to synchronize an idleness of at least one device with the idleness of the processor, the synchronization logic including pre-timing logic to initiate an idleness exit procedure near an end of an idle window in the OS schedule to synchronize activity of the device to an active window in the OS schedule.

2. The apparatus of claim 1, wherein the synchronization logic is to permit an activity of the device during an active window in the OS schedule and to prevent the activity during an idle window in the OS schedule, the active window to be associated with an active state of the processor and the inactive window to be associated with an idle state of the processor.

3. The apparatus of claim 2, wherein the synchronization logic is selected from a group comprising bus logic to defer transactions on a bus, memory logic to suspend a refresh of a memory, clock logic to turn off power to a clock source and controller logic to turn off power to combinatorial logic of a controller.

4. The apparatus of claim 2, wherein the synchronization logic is to determine the active window based on a timer clock synchronization latency of the processor.

5. The apparatus of claim 1, wherein the power management logic is to detect an event, place the processor in an active state in response to the event, remove the processor from the active state if the processor is ready to enter an idle state, and repeat the detecting, placing and removing on a periodic basis according to the OS schedule.

6. The apparatus of claim 5, wherein the power management logic is to synchronize the processor to a timer clock if the processor is ready to enter the idle state.

7. The apparatus of claim 1, wherein the synchronization logic is to synchronize an idleness of each of a plurality of devices with the idleness of the processor.

8. The apparatus of claim 1, wherein the synchronization logic is to selectively synchronize the idleness of the device with the idleness of the processor based on an idleness of a system containing the device and the processor.

9. A method comprising:
   controlling an idleness of a processor based on an operating system (OS) schedule;
   synchronizing an idleness of at least one device with the idleness of the processor; and
   initiating an idleness exit procedure near an end of an idle window in the OS schedule to synchronize activity of the device to an active window in the OS schedule.

10. The method of claim 9, wherein the synchronizing includes:
    permitting an activity of the device during an active window in the OS schedule, the active window being associated with an active state of the processor; and
    preventing the activity during an idle window in the OS schedule, the idle window being associated with an idle state of the processor.

11. The method of claim 10, wherein the preventing is selected from a group comprising deferring transactions on a bus, deferring interrupts, suspending a refresh of a memory, turning off power to a clock source and turning off power to combinatorial logic of a controller.

12. The method of claim 10, further including determining the idle window based on a timer clock synchronization latency of the processor.

13. The method of claim 9, wherein the controlling includes:
    detecting an event;
    placing the processor in an active state in response to the event;
    removing the processor from the active state if the processor is ready to enter an idle state; and
    repeating the detecting, placing and removing on a periodic basis according to the OS schedule.

14. The method of claim 13, further including synchronizing the processor to a timer clock if the processor is ready to enter the idle state.

15. The method of claim 9, wherein the synchronizing includes synchronizing an idleness of each of a plurality of devices with the idleness of the processor.

16. The method of claim 9, further including selectively synchronizing the idleness of the device with the idleness of the processor based on an idleness of a system containing the device and the processor.

17. A system comprising:
    a processor having a memory controller;
    power management logic to control an idleness of the processor based on an operating system (OS) schedule; and
    synchronization logic to synchronize an idleness of at least one device with the idleness of the processor, wherein the synchronization logic is to permit an activity of the device during an active window in the OS schedule and to prevent the activity during an idle window in the OS schedule, the active window to be associated with an active state of the processor and the inactive window to be associated with an idle state of the processor, the synchronization logic including pre-timing logic to initiate an idleness exit procedure near an end of the idle window in the OS schedule to synchronize the activity of the device with an active window in the OS schedule.

18. The system of claim 17 wherein the synchronization logic is selected from a group comprising bus logic to defer transactions on a bus, memory logic to suspend a refresh of a memory, clock logic to turn off power to a clock source and controller logic to turn off power to combinatorial logic of a controller.

19. The system of claim 17, wherein the power management logic is to detect an event, place the processor in an active state in response to the event, remove the processor from the active state if the processor is ready to enter an idle state, and repeat the detecting, placing and removing on a periodic basis according to the OS schedule.

20. The system of claim 17, wherein the synchronization logic is to synchronize an idleness of each of a plurality of devices with the idleness of the processor.

21. The system of claim 17, wherein the synchronization logic is to selectively synchronize the idleness of the device with the idleness of the processor based on an idleness of the system.

22. A method comprising:
detecting an event;
placing a processor in an active state in response to the event;
permitting an activity of each of a plurality of devices if the processor is in the active state;
removing the processor from the active state if the processor is ready to enter an idle state;
preventing the activity of each of the plurality of devices if the processor is in the idle state;
initiating an idleness exit procedure near an end of an idle window in the OS schedule to synchronize the activity of the device with the active window in the OS schedule; and
repeating the detecting, placing, permitting, removing and preventing on a periodic basis according to an operating system (OS) schedule.

23. The method of claim 22, wherein the preventing is selected from a group comprising deferring transactions on a bus, deferring interrupts, suspending a refresh of a memory, turning off power to a clock source and turning off power to combinatorial logic of a controller.

24. The method of claim 22, wherein the preventing includes enforcing an idle window in the OS schedule, the idle window being associated with the idle state of the processor.

* * * * *